United States Patent
Chen et al.

(10) Patent No.: US 11,670,440 B2
(45) Date of Patent: *Jun. 6, 2023

(54) PPTC ACTUATOR HEATER

(71) Applicant: Littelfuse, Inc., Chicago, IL (US)

(72) Inventors: Jianhua Chen, Sunnyvale, CA (US); Rimantas Radzys, Chicago, IL (US)

(73) Assignee: Littelfuse, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/880,902

(22) Filed: Aug. 4, 2022

(65) Prior Publication Data

US 2022/0375660 A1  Nov. 24, 2022

Related U.S. Application Data

(63) Continuation of application No. 17/176,649, filed on Feb. 16, 2021, now Pat. No. 11,488,749, which is a continuation of application No. PCT/CN2020/140264, filed on Dec. 28, 2020.

(51) Int. Cl.
*H01C 7/02* (2006.01)
*H01C 1/14* (2006.01)
*H01B 1/04* (2006.01)
*H01C 17/065* (2006.01)

(52) U.S. Cl.
CPC ............... *H01C 7/027* (2013.01); *H01B 1/04* (2013.01); *H01C 1/1406* (2013.01); *H01C 17/06586* (2013.01)

(58) Field of Classification Search
CPC .... H01C 7/027; H01C 1/1406; H01C 17/065; H01C 1/14; H01B 1/04; H02J 7/00; H02H 3/20; H01H 85/06
USPC ........................................................ 338/22 R
See application file for complete search history.

(56) References Cited

U.S. PATENT DOCUMENTS

| | | | | |
|---|---|---|---|---|
| 11,488,749 | B2* | 11/2022 | Chen | H01C 1/1406 |
| 2018/0012686 | A1 | 1/2018 | Golubovic | |
| 2018/0261362 | A1* | 9/2018 | Hu | H02H 5/042 |
| 2019/0096621 | A1* | 3/2019 | Chen | C08L 23/16 |
| 2019/0222040 | A1* | 7/2019 | Guo | H02H 9/042 |

FOREIGN PATENT DOCUMENTS

| | | |
|---|---|---|
| CN | 110400892 A | 11/2019 |
| CN | 210579283 U | 5/2020 |
| CN | 111628248 A | 9/2020 |
| CN | 211702419 U | 10/2020 |
| CN | 112009694 A | 12/2020 |
| JP | 2019036425 A | 3/2019 |

\* cited by examiner

*Primary Examiner* — Edwin A. Leon
*Assistant Examiner* — Iman Malakooti
(74) *Attorney, Agent, or Firm* — KDW Firm PLLC

(57) ABSTRACT

A novel heater is disclosed for a temperature sensitive actuator. The heater is a polymeric positive temperature coefficient (PPTC) device consisting of conductive filler and semi-crystalline polymer. The PPTC heater is strategically designed to have a predetermined self-regulation temperature suited to whatever application utilizes the heater. Physical characteristics of the PPTC heater, such as gap width and thickness, enable the current flow through the heater to be strategically controlled.

11 Claims, 12 Drawing Sheets

PPTC ACTUATOR HEATER

CROSS REFERENCE TO RELATED APPLICATION

This application is a continuation of, and claims the benefit of priority to, U.S. patent application Ser. No. 17/176,649, filed Feb. 16, 2021, entitled "PPTC ACTUATOR HEATER," which is continuation of and claims priority to PCT Application No. PCT/CN2020/140264, filed Dec. 28, 2020, which is incorporated by reference herein in its entirety.

FIELD OF THE DISCLOSURE

Embodiments of the present disclosure relate to PPTC devices and, more particularly, to a PPTC device that operates as a heater.

BACKGROUND

Positive temperature coefficient (PTC) and polymer PTC (PPTC) devices are utilized in circuits to disrupt overcurrent and overvoltage conditions that may damage expensive circuitry within an electronic system. The PTCs include material that changes its physical properties when heated up. PTCs increase resistance as temperature increases due to increased current flow. Once the fault condition is removed, the PTC device cools down to its original configuration. The PTC and PPTC are thus thought of as resettable fuses.

Recently, the PTC technology is being used for heater applications. However, the PTC devices are awkward for some applications, due to their size and shape, such that they must have a much higher power density than is needed to be effective in heating applications.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a polymeric positive temperature coefficient (PPTC) heater in accordance with the present disclosure may include a first electrode connected to a first wire, a heater body made up of a PPTC polymer matrix, where the PPTC polymer matrix includes both a conductive filler and a semi-crystalline polymer. The PPTC heater also includes a second electrode connected to a second wire, with the PPTC polymer matrix being between the first electrode and the second electrode to form a sandwich. A bending process is employed to shape the sandwich into an annular shape.

Another exemplary embodiment of a PPTC heater in accordance with the present disclosure may include a heater body which includes a conductive filler and a semi-crystalline polymer, the heater body being configured into a rectangular sheet of a predetermined thickness, a first electrode located over a side surface of the heater body at a first end, the first electrode being connected to a first wire, a second electrode located over the same side surface of the heater body at a second end, the second electrode being connected to a second wire. There is a gap between the first and second electrode and the gap is horizontal relative to the first and second wires. The gap has a second predetermined thickness and the heater body between the first and second electrode is exposed by the gap. The PPTC heater is formed into an annular shape such that the first electrode and the second electrode are on an inner surface.

Another exemplary embodiment of a PPTC heater in accordance with the present disclosure may include a heater body which includes a polymer matrix, the heater body being configured into a rectangular sheet of a predetermined thickness, a first electrode located over a side surface of the heater body at a first end, the first electrode being connected to a first wire, a second electrode located over the same side surface of the heater body at a second end, the second electrode being connected to a second wire. There is a gap between the first and second electrode and the gap is vertical relative to the first and second wires. The gap has a second predetermined thickness and the heater body between the first and second electrode is exposed by the gap. The PPTC heater is formed into an annular shape such that the first electrode and the second electrode are on an inner surface.

DETAILED DESCRIPTION

In accordance with the embodiments described herein, a novel heater is disclosed for a temperature sensitive actuator, such as for an exhaust heat recovery system. The heater is a polymeric positive temperature coefficient (PPTC) device consisting of conductive filler and semi-crystalline polymer. The conductive filler may be a carbon/graphene combination, as one example, but the PPTC heater may be made from a variety of conductive fillers. The PPTC heater is strategically designed to have a predetermined self-regulation temperature suited to whatever application utilizes the heater. Physical characteristics of the PPTC heater, such as gap width and thickness, enable the current flow to be strategically controlled.

Figure 1A:
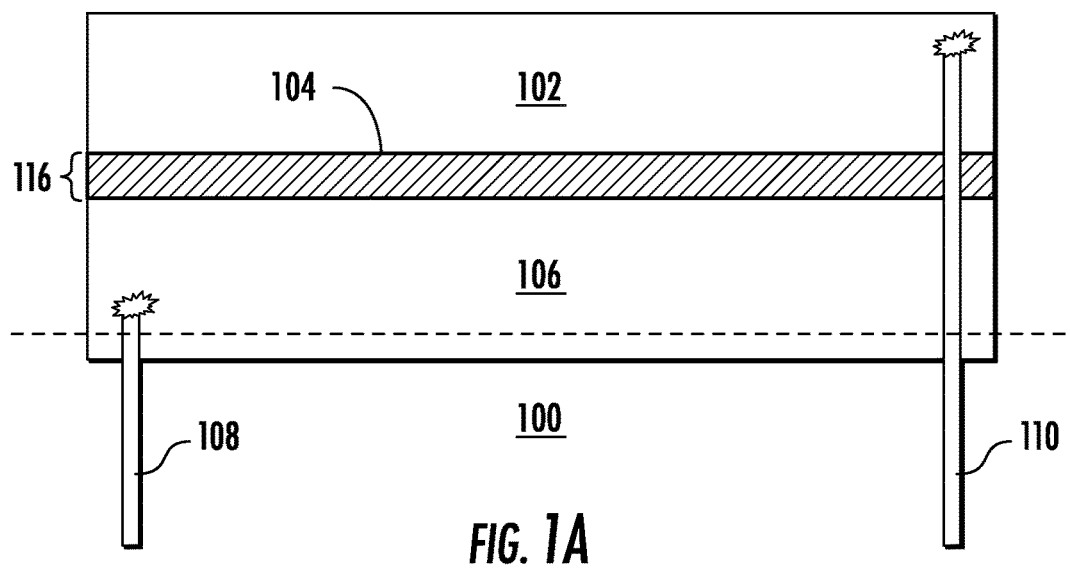
FIGS. 1A-1C are diagrams of a PPTC heater, in accordance with exemplary embodiments.
Figure 1B:
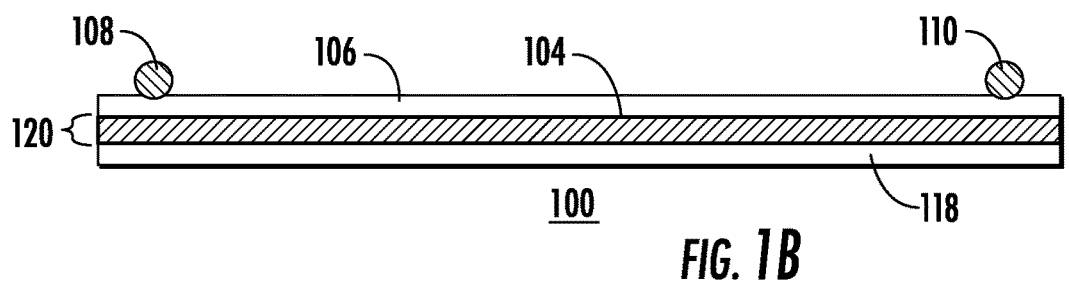
Figure 1C:
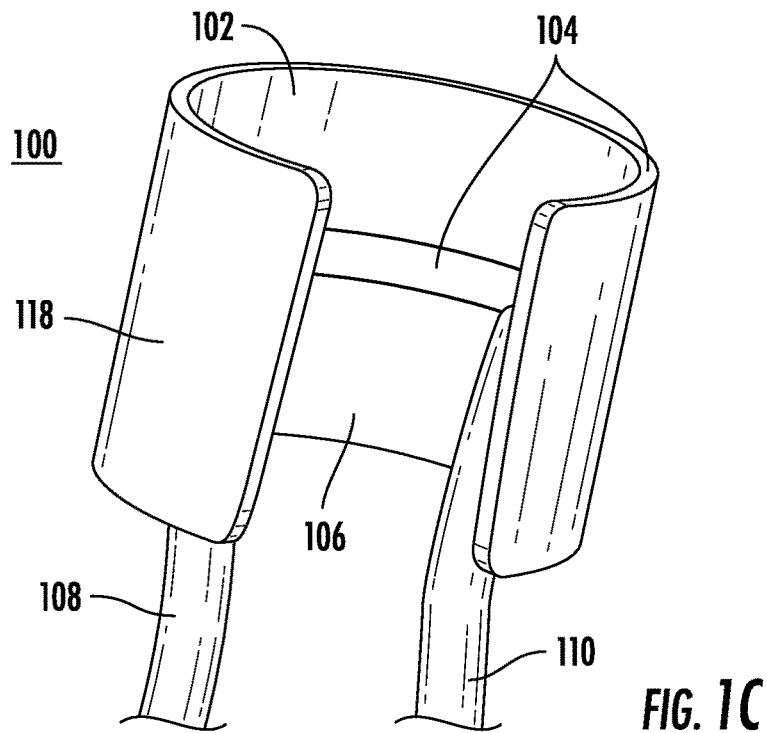

FIGS. 1A-1C are representative drawings and an illustration of a novel PPTC heater 100 for operating an actuator, or PPTC actuator heater 100, according to exemplary embodiments. FIGS. 1A and 1B depict a side plan view and top cross-sectional view, respectively, of the PPTC heater 100. The PPTC heater 100 includes a heater body 104 consisting of a PTC material. The heater body 104 is substantially planar in shape, having two opposing surfaces. In an exemplary embodiment, the heater body 104 is less than 1 mm in thickness. The heater body is further described and illustrated in FIG. 8, below.

The PPTC heater 100 includes a first electrode 106 and a second electrode 102, both of which are disposed on a first opposing surface of the heater body 104. The electrodes 102/106 are conductive layers that are separated by a gap 116, where no conductive layer is present and the heater body 104 is exposed at the gap. In the side plan view of FIG. 1A, the gap 116 is horizontally disposed, with the first electrode 106 being below the gap 116 and the second electrode 102 being above the gap. A first lead (wire) 108 is connected to the first electrode 106 while a second lead 110 is connected to the second electrode 102.

FIG. 1B further illustrates a third electrode 118 disposed on a second opposing surface of the heater body 104, the second surface being opposite from the first surface on which the first and second electrodes 106 and 102 are disposed, the third electrode 118 not being visible in FIG. 1A. The heater body 104 has a thickness 120. The heater body 104 is thus sandwiched between electrodes 102/106 on one side and electrode 118 on the other side, with the gap 116 exposing the heater body between electrodes 102 and 106.

FIG. 1C is an illustration of the PPTC heater 100, in accordance with exemplary embodiments. The PPTC heater 100 is an annular (ring) shape suitable to be placed around a cylindrical-shaped device to be heated. In an exemplary embodiment, the device to be heated is an actuator. An actuator is a device that makes something move or operate. The actuator converts a source of energy (electric, hydraulic, or pneumatic) into physical mechanical motion. Actuators can move in a straight line (linear) or in a circular (rotary) direction. In an exemplary embodiment, the heating of the actuator by the PPTC heater 100 activates the actuator, causing it to move in a linear or rotary direction.

In the illustration of FIG. 1C, electrodes 102 and 106 are disposed on an inside surface of the annular shape of the PPTC heater 100, while the electrode 118 is disposed on an outside surface. The PPTC material of the heater body 104 is shown both in between the electrodes 102 and 106 (as a horizontally disposed opening) and along an upper edge of the ring. Wires 108 and 110 are disposed on the inner electrodes 102 and 106, respectively.

In an exemplary embodiment, the annular shape of the PPTC heater 100 is wrapped around a thermo-element of the cylindrical-shaped actuator. Accordingly, the PPTC heater 100 makes contact with the thermo-element of the actuator, enabling the actuator to heat up quickly and be activated to move. In this manner, the PPTC actuator heater 100 provides an advantage in the application of exhaust heat recovery systems in which a piston is activated to move linearly (advance and retract) by the actuator. Further, the annular shape of the PPTC heater 100 is a temperature limitation feature, as the heater limits the disposition of heat to a precise location (the thermo-element of the actuator). The PPTC heater thus ensures the stable output of the linear movement of the piston by limiting the heating to the thermoelement.

In an exemplary embodiment, the PPTC actuator heater 100 is thin (less than 1 mm in thickness) and small (less than 1 cm in diameter). This small size enables the PPTC actuator heater 100 to be in direct contact with the thermo-element of the actuator, which results in high heat efficiency, in some embodiments. The cylindrically shaped PPTC heater 100 may thus be mounted in the heating target area of the actuator.

In addition to reducing heat loss, in exemplary embodiments, the design of the PPTC heater 100 is simpler than some legacy PPTC devices, which may save in manufacturing cost. Legacy PPTC or ceramic PTC (cPTC) devices that are currently available are generally in a flat rectangular or rounded shape, with thicknesses exceeding 1 mm. In applications involving limited space and/or electrical insulation requirements, these PTC heating element are not able to be located close to the target area. The resulting disposition of the legacy PTC device results in slow heating of the target surface as well as high heat losses. In one example, the use of a legacy PTC device used to heat a target surface resulted in a surface temperature of the PTC device reaching about 200° C. but the target surface reaching only 100° C., which is quite inefficient.

There exist some thin film PPTC devices with thicknesses below 1 mm, but the power density for these devices is very low. Such thin film PPTC devices would thus need to be large enough to generate enough heat in a short time. In one embodiment, the PPTC heater 100 has a much higher power density than existing thin film PPTC devices.

Figure 2A:
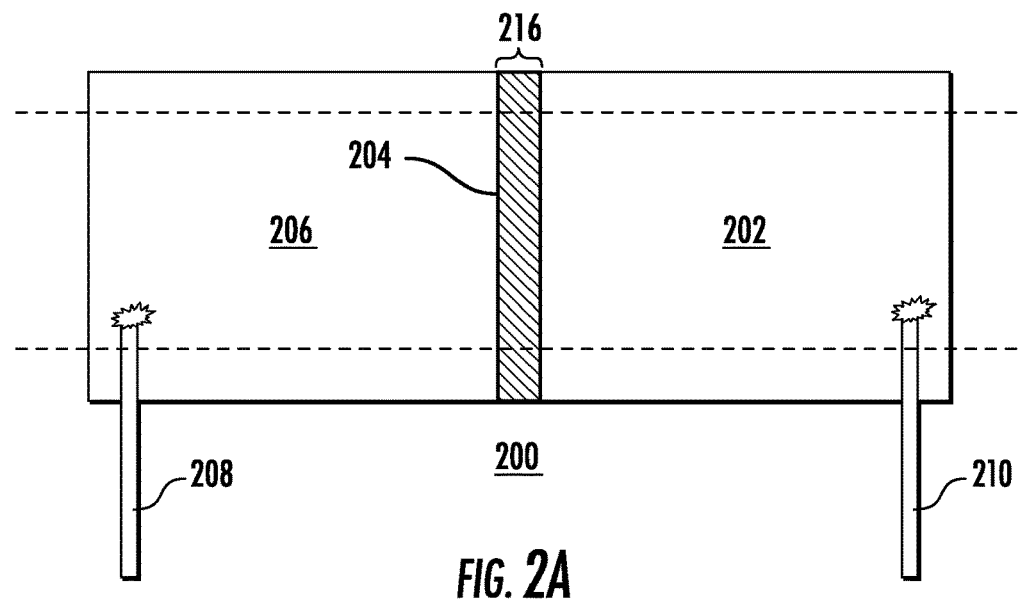
FIGS. 2A-2C are diagrams of a PPTC heater, in accordance with exemplary embodiments.
Figure 2B:
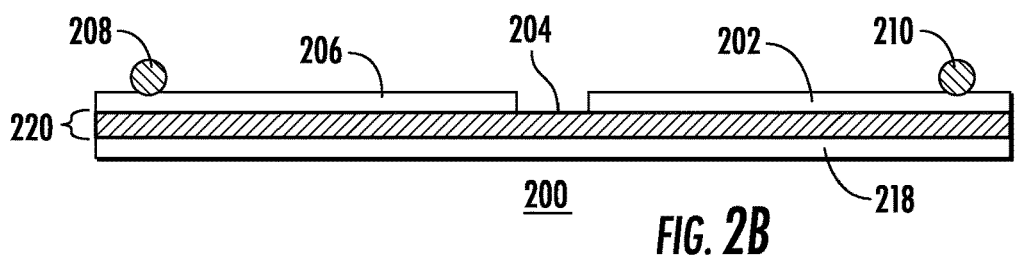
Figure 2C:
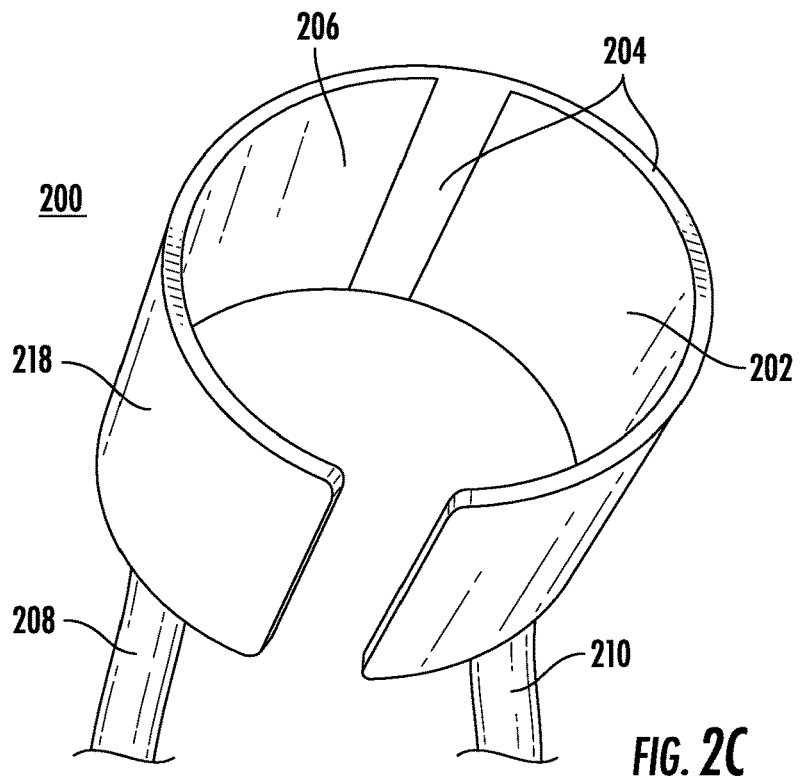

FIGS. 2A-2C are representative drawings associated with a PPTC heater for operating an actuator, according to exemplary embodiments. FIGS. 2A and 2B depict a side plan view and top cross-sectional view, respectively, of the PPTC heater 200, according to an exemplary embodiment. The PPTC heater 200 includes a heater body 204 consisting of a PTC material. The heater body 104 is substantially planar in shape, having two opposing surfaces. In an exemplary embodiment, the heater body 204 is less than 1 mm in thickness. The heater body is further described and illustrated in FIG. 8, below.

The PPTC heater 200 includes a first electrode 206 and a second electrode 202, both of which are disposed on a first opposing surface of the heater body 204. These electrodes 202/206 are conductive layers that are separated by a gap 216, where no conductive layer is present and the heater body 204 is exposed at the gap. In the side plan view of FIG. 2A, the gap 216 is vertically disposed, with the first electrode 206 being to the left of the gap and the second electrode 202 being to the right of the gap. A first lead (wire) 208 is connected to the first electrode 206 while a second lead 210 is connected to the second electrode 202.

FIG. 2B further illustrates a third electrode 218 disposed on a second opposing surface of the heater body 204, the second surface being opposite from the first surface on which the first and second electrodes 206 and 202 are disposed, where the third electrode 218 is not visible in FIG. 2A. The heater body 204 has a thickness 220. The heater body 204 is thus sandwiched between electrodes 202/206 on one side and electrode 218 on the other side, with the gap 216 exposing the heater body between electrodes 202 and 206.

FIG. 2C is an illustration of the PPTC heater 200, in accordance with exemplary embodiments. The PPTC heater 200 is an annular (ring) shape suitable to be placed around a cylindrical-shaped device to be heated. In an exemplary embodiment, the device to be heated is an actuator. In an exemplary embodiment, the heating of the actuator by the PPTC heater 200 activates the actuator, causing it to move in a linear or rotary direction.

In the illustration of FIG. 2C, electrodes 202 and 206 are disposed on an inside surface of the annular shape of the PPTC heater 200, while the electrode 218 is disposed on an outside surface. The PPTC material of the heater body 204 is shown both in between the electrodes 202 and 206 (as a vertically disposed opening) and along an upper edge of the ring. Wires 208 and 210 are disposed on the inner electrodes 206 and 202, respectively. The PPTC heaters 100 and 200 exhibit the same general power designs, with N=1 (where N represents the total number of slots on both sides of the heater electrodes).

Figure 3A:
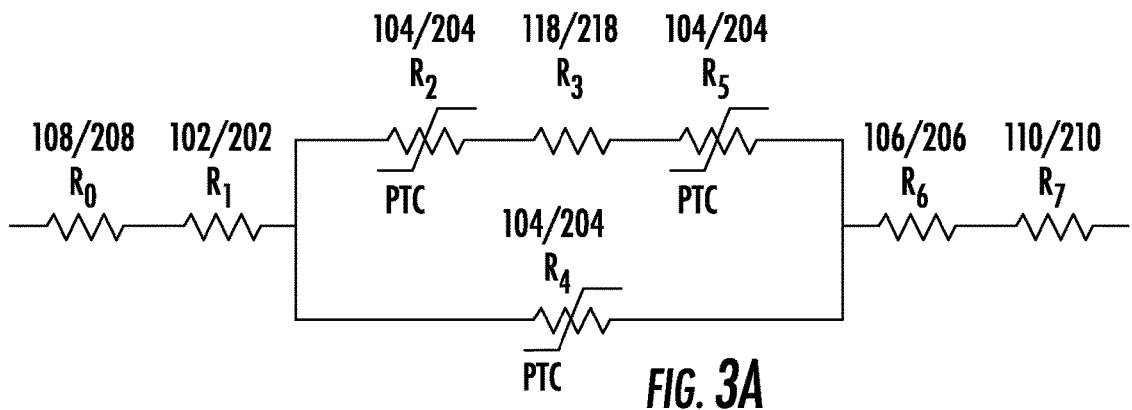
FIGS. 3A-3C are diagrams illustrating properties of the PPTC heaters of FIGS. 1 and 2, in accordance with exemplary embodiments.
Figure 3B:
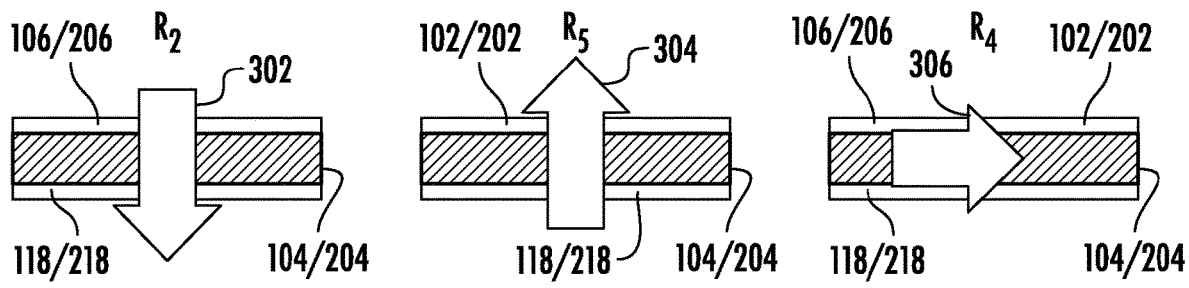
Figure 3C:
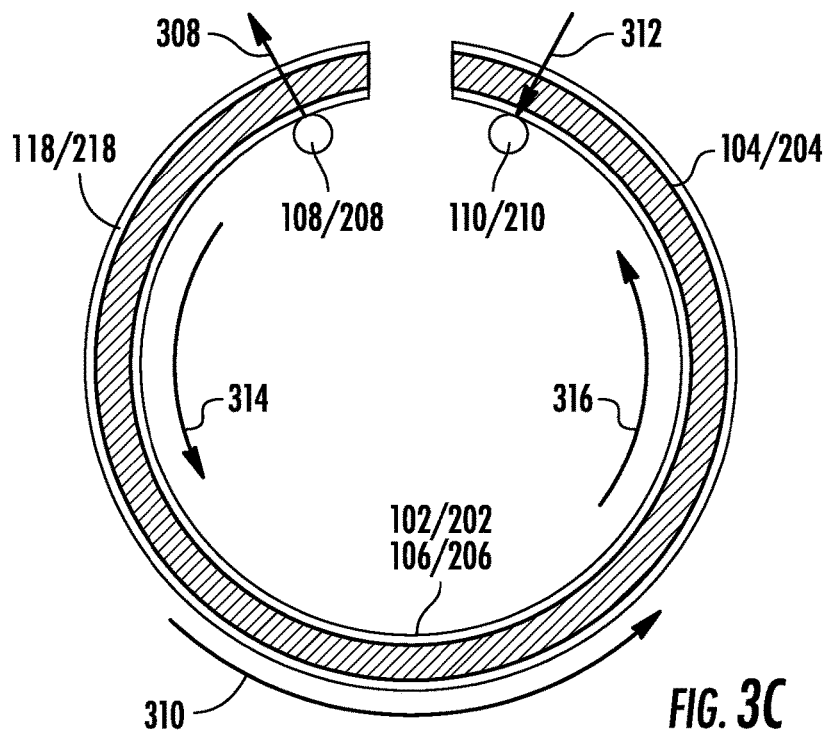

FIGS. 3A-3C are representative drawings illustrating properties of the PPTC heaters 100 and 200, in accordance with exemplary embodiments. FIG. 3A presents an equivalent circuit of the PPTC heaters 100 (FIGS. 1A-1C) and 200 (FIGS. 2A-2C), according to an exemplary embodiment. $R_0$ and $R_7$ represent the resistance of the wires 108/208 and 110/210, respectively (and vice-versa), $R_1$ and $R_6$ represent the resistance of the electrodes 102/202 and 106/206 respectively (and vice-versa), $R_3$ represents the resistance of electrode 118/218, and $R_2$, $R_4$, and $R_5$ represent the heater body 104/204 (PTC material). In an exemplary embodiment, the resistance $R_4$ is significantly greater than the resistances $R_2$ or $R_5$.

Although there is a single heater body 104/204 of PTC material, the flow of current through the heater 100/200 may take three possible paths through the PTC material of the heater body 104/204, as given by $R_2$, $R_4$, and $R_5$. FIG. 3B illustrates the three possible current paths through the heater body that may occur with both PPTC heaters 100 and 200, according to exemplary embodiments. The arrows 302, 304, and 306 show the direction of current flow through the PPTC material. FIG. 3A shows that there are two possible paths for current flow. A first current path goes through the $R_0$, $R_1$, $R_2$, $R_3$, $R_5$, $R_6$, and $R_7$. The arrows 302 and 304 are thus sub-paths of the first current path. The second current path goes through $R_0$, $R_1$, $R_4$, $R_6$, and $R_7$. The arrow 306 is thus part of the second current path.

At the resistance $R_2$ (indicated by arrow 302), the current flows through the PPTC material between the electrode 106/206 ($R_6$) and the electrode 118/218 ($R_3$). At the resistance $R_5$ (indicated by the arrow 304), the current flows through the PPTC material between the electrode 118/218 ($R_3$) and the electrode 102/202 ($R_1$). At the resistance $R_4$ (indicated by the arrow 306), the current flows through the PPTC material between the electrode 106/206 ($R_1$) and the electrode 102/202 ($R_6$). Because the resistance $R_4$ is significantly greater than the resistances $R_2$ or $R_5$, in exemplary embodiments, the third current flow direction ($R_4$) is less likely to occur than the other current flow directions given by resistances $R_2$ or $R_5$.

FIG. 3C is a representative drawing of the PPTC heaters 100 or 200 in an annular shape, according to exemplary embodiments. FIG. 3C is used to illustrate the possible current flow directions through the annular-shaped PPTC heaters 100 and 200. The annular-shaped ring consists of the heater body 104/204 in the center, with third electrode 118/218 surrounding on an outer surface of the ring and first electrodes 106/206 and second electrodes 102/202 disposed on the inside surface of the ring. For the PPTC heater 100, the second electrode 102 is disposed above the first electrode 106 (see also FIGS. 1A and 1C) on the inside surface of the ring. For the PPTC heater 200, the first electrode 206 is disposed on one side while the second electrode 202 is disposed on the other side of the inside surface of the ring (see also FIGS. 2A and 2C).

As in FIG. 3B, the arrows show the possible direction of current flow. Starting with the lead 108/208 (indicated by arrow 308 and the resistance $R_2$), the current flows from the electrode 106/206 across the PPTC material of the heater body 104/204, to the electrode 118/218 disposed on the opposing side of the heater body. Current flows along the electrode 118/218 (indicated by arrow 310 and the resistance $R_3$). Current next flows from the electrode 118/218 across the PPTC material of the heater body 104/204 to the lead 110/210 (indicated by the arrow 312 and resistance $R_5$). Alternatively, current may flow between electrode 106/206 to electrode 102/202, as indicated by arrows 314 and 316 (and vice-versa), as also indicated by the resistance $R_4$.

In various embodiments, the design of the heater body and electrodes of the PPTC heaters 100 and 200 may be such that the value of $R_4$ is much greater than the value of $R_2$ or $R_5$ (FIG. 3A). This situation may be accomplished in the PPTC heater 100 (FIGS. 1A and 1B) and the PPTC heater 200 (FIGS. 2A and 2B) by arranging the thickness 120/220 of the heater body 104 to be relatively less than the gap 116/216. In an exemplary embodiment, the thickness 120 of the heater body 104 (FIG. 1B) or the thickness 220 of the heater body 204 (FIG. 2B) is between 3 mils and 120 mils in various non-limiting embodiments, between 5 mils and 10 mils in some embodiments, while the value of the gap, either the horizontally disposed gap 116 between electrode 102 and electrode 106 (FIG. 1A), or the vertically disposed gap 216 between electrode 202 and electrode 206 (FIG. 2A), is relatively greater than the thickness 116/216 of respective heater bodies 104/204. For example, if the thickness 120 of the heater body 104 is 10 mils, the value of gaps 116 or 216 may be 50 mils or greater, ensuring that $R_4$ is much larger than $R_2$ or $R_5$.

In an exemplary embodiment, the resistance of the PPTC heaters 100 and 200 represented by the equivalent circuit (FIG. 3A) is approximately the value of the initial resistance multiplied by 4 ($R \approx 4R_i$ when $R_2 = R_5$ and the heater is in a non-tripping state). According to variants of these embodiments, the design of the slot (either gap 116 or gap 216) location can determine the heating effect (one side higher; another side lower, by controlling the resistance of each PPTC segment) on the top and bottom (PPTC heater 100) or on the left and right sides (PPTC heater 200). In one embodiment, the PPTC heater 100 design has a better mechanical strength than the PPTC heater 200 in examples where the overall heater is to be bent in an annular shape.

Figure 4A:
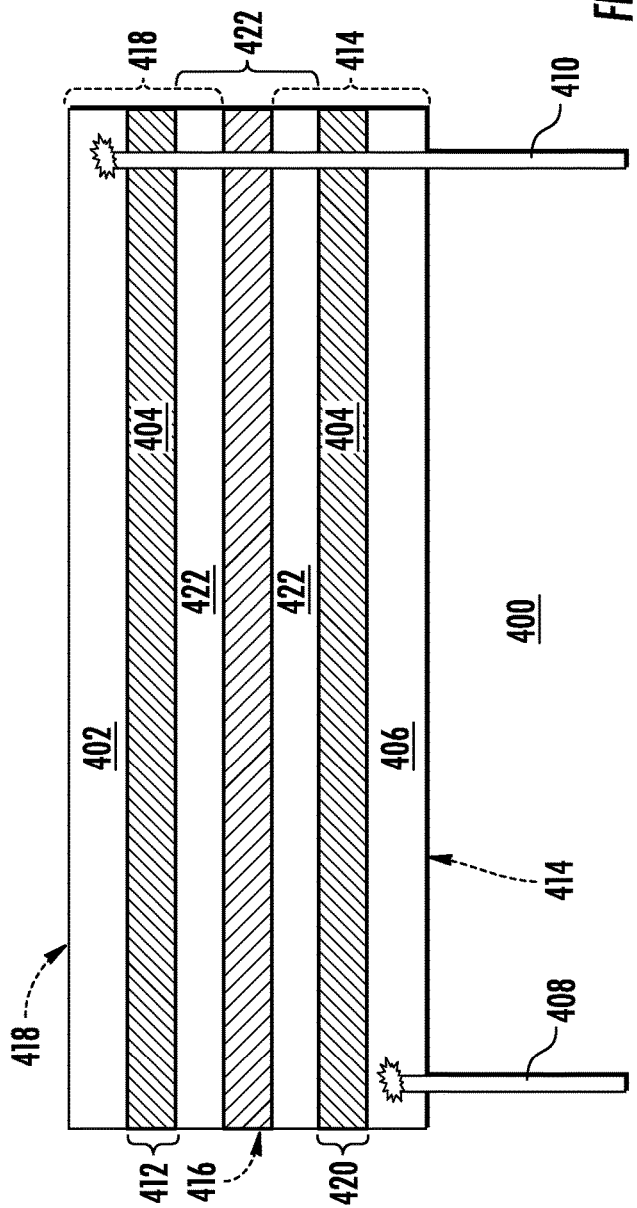
FIGS. 4A-4B are a diagrams and equivalent circuit, respectively, of a PPTC heater, in accordance with exemplary embodiments.

FIG. 4 features a side plan view of a PPTC heater 400, according to exemplary embodiments. As in the aforementioned embodiments, the design of the PPTC heater 400 also features two electrodes connected to external wires which are disposed on the same side of the device. Electrode 406 is connected to wire 408 and an electrode 402 is connected to a wire 410. The electrode 402 is separated from the electrode 406 by a slot 420 and a slot 412, where no conductive layer is present, exposing a heater body 404 of PPTC material. In addition, a conductive region 422 is disposed between the slot 412 and slot 420, where a material, such as a material of the electrode 402 and electrode 406 is present. The slots 420, 412 thus define regions along the surface of PPTC heater 400 that are relatively higher resistance, as compared to the resistance of the electrodes 402, 406 and the material of conductive region 422. In the side plan view of FIG. 4, the slots 412, 420 are arranged to extend perpendicularly with respect to the general direction of the wire 408 and the wire 410. In addition to the electrodes 402, 406 and conductive region 422, the PPTC heater 400 includes a conductive region 414 and conductive region 418, disposed, in each case, on the opposite side of the heater body 404, and separated by a slot 416. The slot 416 is shown in a lighter shade, due to being on the opposite side of the heater body.

Figure 4B:
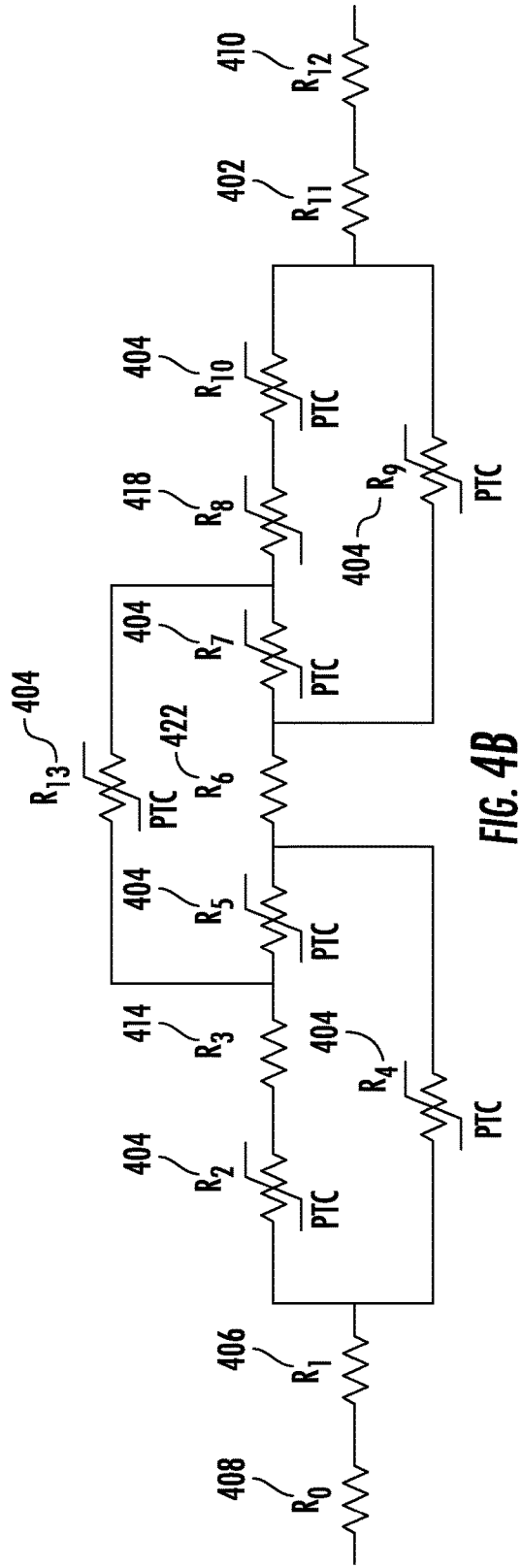

As such, the PPTC heater 400 may be characterized by the equivalent circuit shown in FIG. 4B, where $R_0$ and $R_{12}$ represent the resistance of the wires 408, 410, $R_1$, $R_3$, $R_6$, $R_8$, $R_{11}$ represent resistance of the electrodes, $R_2$, $R_5$, $R_7$, and $R_{10}$ represent the resistance of the heater body 404 to current flowing through the thickness of the heater body 404 (that is, perpendicular to both the wires 408, 410 and the slots 412, 416, and 420, or in a Z direction), and $R_4$, $R_9$, and $R_{13}$ represent resistance of the heater body 404 to current flowing along the surfaces of heater body 404 (that is, parallel to the wires 408, 410, but perpendicular to the slots 412, 416, and 420, or in a Y direction). In particular, during operation below the trip temperature, the current of the PPTC heater 400 may flow between wire 408 and wire 410 by flowing mainly through wire 408 ($R_0$) through the electrode 406 ($R_1$), through the thickness of the heater body 404 ($R_2$) (in the Z direction); along the surface of conductive region 414 ($R_3$) which is along the backside of the heater body, back through the thickness of the heater body 404 ($R_5$), in the Z direction, to the front of the device; along the surface of conductive region 422 ($R_6$); through the thickness of the heater body 404 ($R_7$) in the Z direction to the back of the device; along the surface of conductive region 418 ($R_8$); through the thickness of the heater body 404 ($R_{10}$) in the Z direction, again to the front of the device; and through the electrode 402 ($R_{11}$) and the wire 410 ($R_{12}$). In other words, during operation below the trip temperature, the current does not jump in the Y direction across the slots 412 or 420 on the front side of the device, nor across the slots 416 on the back side of the device. Generally, because the size of the slots 416, 412, 420 (gaps) may be much larger than the thickness of the heater body 404, the current does not typically flow along the paths in the plane of the heater body (in the Y direction) as indicated by resistances $R_4$, $R_9$, $R_{13}$.

Figure 5:
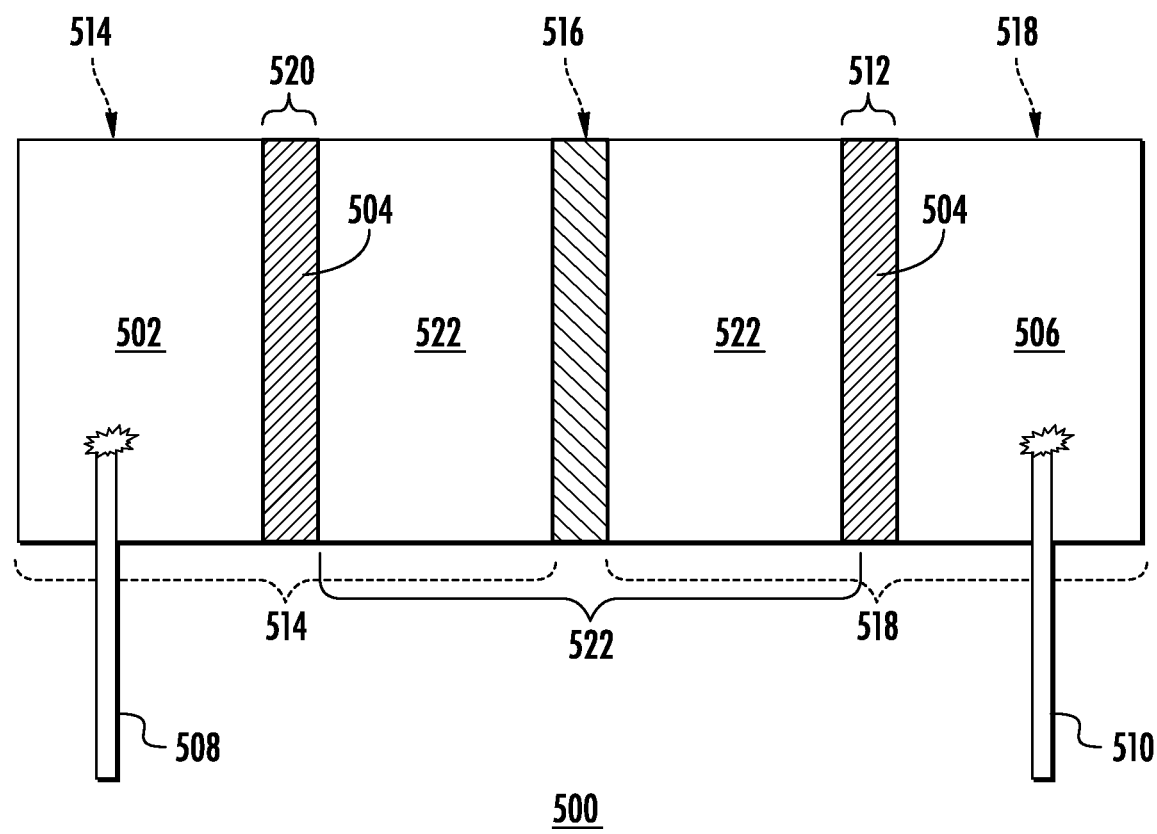
FIG. 5 is a diagram of a PPTC heater, in accordance with exemplary embodiments.

FIG. 5 features a side plan view of a PPTC heater 500, according to exemplary embodiments. In FIG. 5, the heater configuration is generally the same as for the PPTC heater 400 (FIG. 4A), except that a pair of slots 520, 512 are arranged to extend generally parallel with respect to the general direction of the wire 508 and the wire 510. In particular, an electrode 502 is connected to wire 508 and an electrode 506 is connected to a wire 510. The electrode 502 is separated from the electrode 506 by a slot 512 and a slot 520, where no conductive layer is present, exposing the heater body 504. In addition, a conductive region 522 is disposed between the slot 512 and slot 520, where a material, such as a material of the electrode 502 and electrode 506 is present. The slots 512, 520 thus define regions along the surface of PPTC heater 500 that are relatively higher resistance, as compared to the resistance of the electrodes 502, 506 and the material of conductive region 522. In addition to the electrodes 502, 506 and conductive region 522, the PPTC heater 500 includes a conductive region 514 and conductive region 518, disposed on the opposite side of the heater body 504, and separated by a slot 516. The slot 416 is shown in a lighter shade, due to being on the opposite side of the heater body.

As with the PPTC heater 400 (FIG. 4A), the PPTC heater 500 may be characterized by the equivalent circuit of FIG. 4B, where $R_0$ and $R_{12}$ represent the resistance of the wires 508, 510, $R_1$, $R_3$, $R_6$, $R_8$, $R_{11}$ represent resistance of the electrodes, $R_2$, $R_5$, $R_7$, and $R_{10}$ represent the resistance of the heater body 504 to current flowing through the thickness of the heater body 504 (that is, perpendicular to the both the wires 508, 510 and the slots 512, 516, and 520, or in a Z direction), and $R_4$, $R_9$, and $R_{13}$ represent resistance of the heater body 504 to current flowing along the surfaces of heater body 504 (that is, perpendicular to both the wires 508, 510 and the slots 512, 516, and 520, or in an X direction). In particular, during operation below the trip temperature, the current of the PPTC heater 500 may flow between wire 508 and wire 510 by flowing mainly through wire 510 ($R_0$) through the electrode 502 ($R_1$), through the thickness of the heater body 504 in a Z direction to the backside of the device ($R_2$); along the surface of conductive region 514 ($R_3$), through the thickness of the heater body 504 ($R_5$) in the Z direction along the surface of conductive region 522 ($R_6$) back to the front of the device; through the thickness of the heater body 504 ($R_7$); along the surface of conductive region 518 ($R_8$); through the thickness of the heater body 504 ($R_{10}$) in the direction again to the front of the device; through the electrode 506, and wire 510 ($R_{12}$). Generally, because the size of the slots 516, 512, 520 (gaps) may be much larger than the thickness of the heater body 504, the current may not flow along the paths in the plane of the heater body as indicated by resistances $R_4$, $R_9$, $R_{13}$.

In summary, the PPTC heater 400 and 500 configurations provide the same power designs (N=3). The resistance of the given heater resistance is approximately the initial resistance multiplied by 16 ($R \approx 16R_i$ when $R_2=R_5=R_7=R_{10}$ and the PPTC heater is in a non-tripped state).

Figure 6A:
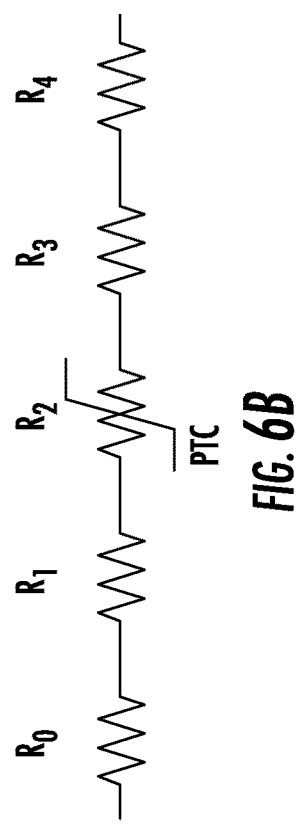
FIGS. 6A-6D are diagrams illustrating a PPTC heater, including an equivalent circuit, in accordance with exemplary embodiments.
Figure 6B:
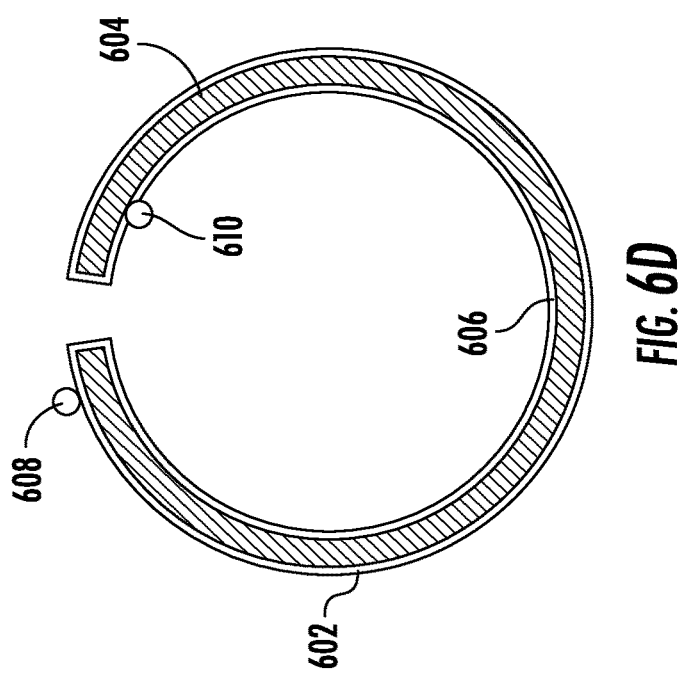
Figure 6D:
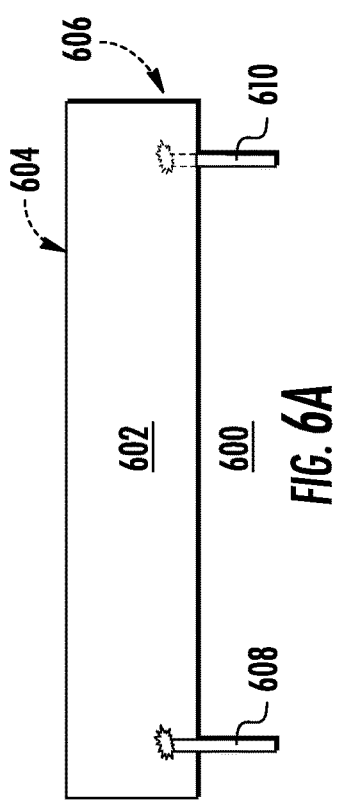
Figure 6C:
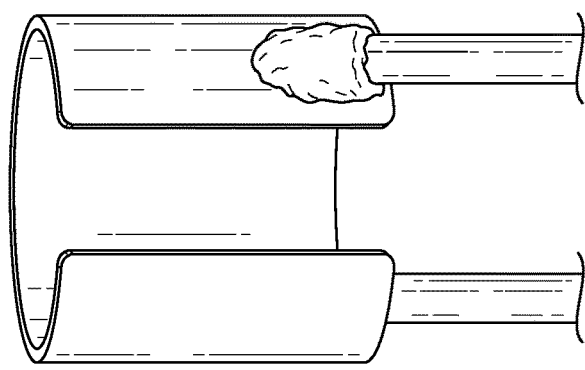

FIGS. 6A-6D are representative drawings associated with a PPTC heater 600, according to exemplary embodiments. FIG. 6A shows a side plan view of a PPTC heater 600, FIG. 6B is an equivalent circuit for the PPTC heater 600, FIG. 6C is a photograph of the PPTC heater 600, and FIG. 6D shows the PPTC heater 600 in an annular shape, such as may be used with an actuator. In FIGS. 6A and 6D, the PPTC heater 600 includes a heater body 604 (not visible in FIG. 6A) sandwiched between a first electrode 602 (shown on the outside surface of the annular shape in FIG. 6D) and a second electrode 606 (shown on the inside surface of the annular shape in FIG. 6D). A first wire 608 is disposed on the front of the PPTC heater 600 (outside the annular surface) while a second wire 610 is disposed on the back side (inside the annular surface). In this example, the first electrode 602 is connected to the wire 608, while the second electrode 606 is connected to the wire 610. As such, current will pass through the thickness of the PPTC heater body in the Z direction. In the equivalent circuit of FIG. 6B, $R_0$ and $R_4$ represent the resistance of the wires 608, 610, $R_1$ and $R_3$ represent resistance of the electrodes 602, 606 and $R_2$ represents the resistance of the heater body 604 to current flowing through the thickness of the heater body Like the PPTC heaters 100, 200, the PPTC heaters 400, 500, 600 may be formed into an annular (ring-like) shape for use in enabling/activating an actuator. Any of the disclosed PPTC heaters may be positioned such that the heater body of the device is disposed against the thermo-element of the actuator, causing the actuator to move in a linear or rotary direction in response to being heated up by the PPTC heater.

FIGS. 7A-7D are side plan views of a PPTC heater 700, according to exemplary embodiments. The PPTC heater 700 is disposed on an actuator 702. Though appearing as a rectangle in the side plan views of FIGS. 7A-7D, the PPTC heater 700 is actually annular in shape, such as in FIGS. 1C, 2C, 3C, 6C, or 6D, and is disposed over a top portion, or thermo element 704, of the actuator 702. In one embodiment, the thermo element 704 of the actuator 702 includes a waxy matrix 706, such as paraffin wax mixed with metal materials, such that the waxy matrix is between the PPTC heater 700 and the actuator 702 when the PPTC heater is disposed thereon. The waxy matrix 706 is present to facilitate control of the on/off valve (not shown) of the actuator 702. Note that according to various embodiments, the PPTC heater 700 is disposed in a thin, annular form to circumferentially surround the thermo element 704 (see, e.g., FIG. 1C). The PPTC heater 700 thus heats, and eventually melts, the waxy matrix 706, which subsequently heats the thermo element 704 and activated the actuator 702, causing the actuator to then move in a linear or rotary direction. Once the temperature of the PPTC heater 700 cools down, the melted waxy matrix 706 again hardens, protecting the actuator.

Figure 7A:
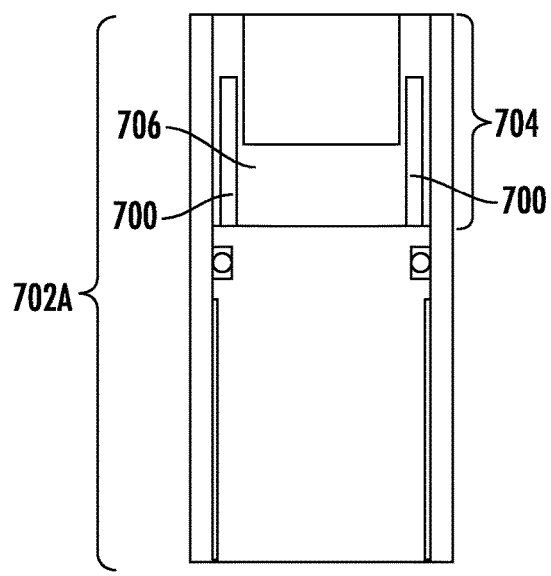
FIGS. 7A-7D are diagrams of an actuator activated by a PPTC heater, in accordance with exemplary embodiments.
Figure 7B:
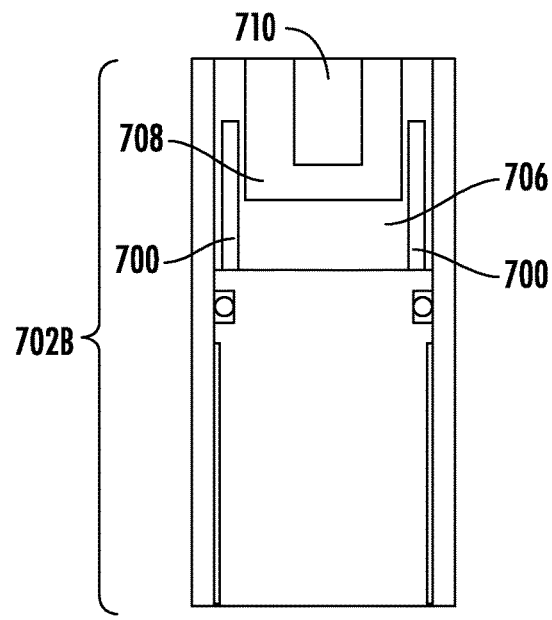
Figure 7C:
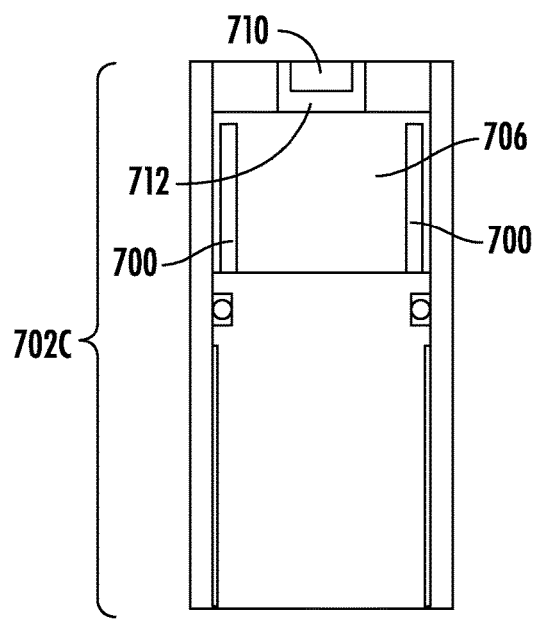
Figure 7D:
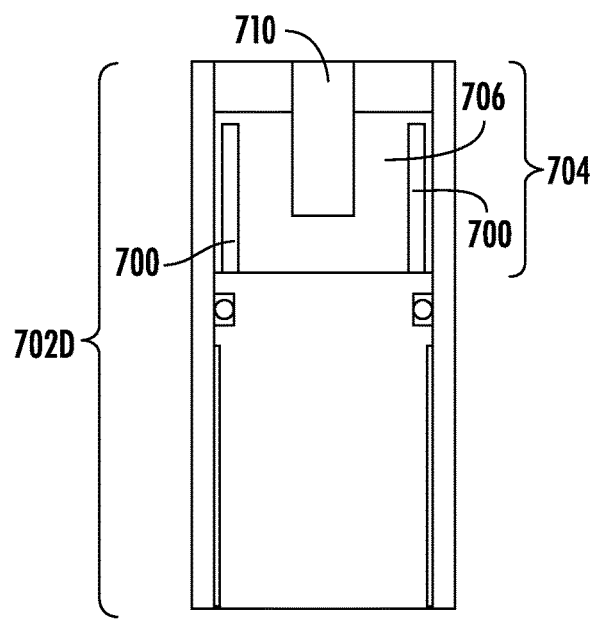

A general view of the actuator 702A with the waxy matrix 706 is shown in FIG. 7A; a general view of a squeeze-push type actuator 702B with the waxy matrix 706 is shown in FIG. 7B; a general view of diaphragm-type actuator 702C with the waxy matrix 706 is shown in FIG. 7C; a general view of a plunger piston-type actuator 702D with the waxy matrix 706 is shown in FIG. 7D (collectively, "actuator(s) 702"). In an exemplary embodiment, the waxy matrix 706 is a key element of thermoactuator functioning, as the waxy matrix, when heated, makes the actuator switch on or off. The heated waxy matrix 706 squeezes an elastomeric bag 708 (FIG. 7B) or a membrane 712 (FIG. 7C) of the actuator 702 and moves a piston 710. Alternatively, the heated waxy matrix squeezes and move the piston 710. In an exemplary embodiment, the PPTC heater 700 is insulated with parylene by chemical vapor deposition (CVD) or other coatings to avoid a short circuit, since the thermoelement of the actuator 702 generally consists of the metal particles in the waxy matrix.

In an exemplary embodiment, the PPTC heater 700, as well as any of the other PPTC heaters 100, 200, 400, 500, and 600, are self-regulating heaters, with the self-regulation temperature being dependent on the particular application. In an exemplary embodiment, the PPTC heater 700 has a self-regulation temperature of around 125° C. The self-regulation temperature is thus a ceiling temperature for the PPTC heater. Thus, while the temperature of the PPTC heater 700 may increase up to about 125° C., it does not exceed that temperature, if the temperature is higher than 125° C., its heating power will reduce to prevent overheating of the actuator. Thus, where the PPTC heater is combined with an actuator, as in FIGS. 7A-7D, the PPTC heater increases in temperature up to about 125° C., the associated wax in the actuator is fully melted, causing movement of the actuator valve, and the temperature of the PPTC heater thereafter will not over 125° C.

Figure 8:
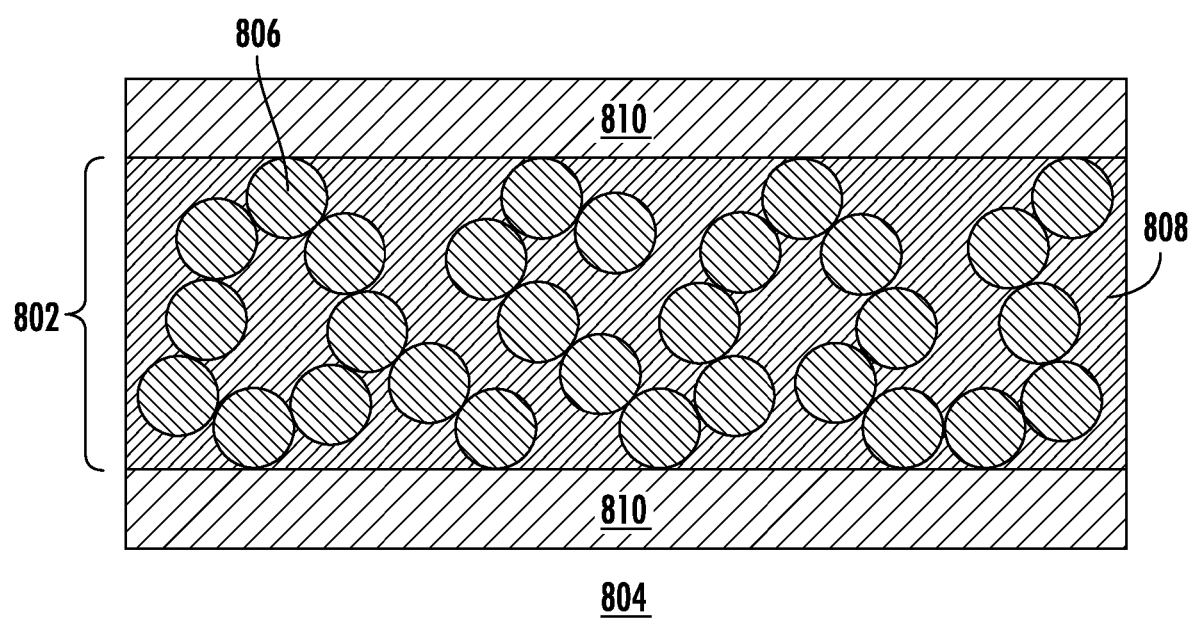
FIG. 8 is a diagram of a heater body for any of the disclosed PPTC heaters, in accordance with exemplary embodiments.

FIG. 8 is a side plan view of a heater body of a PPTC heater, in accordance with exemplary embodiments. Recall that the PPTC heaters disclosed herein include a heater body that consists of PPTC material (see, e.g., heater body 104 in FIGS. 1A-1C), where the PPTC material consists of a polymer matrix consisting of 1) conductive filler (such as carbon and/or graphene) and 2) a semi-crystalline polymer. As shown in FIG. 8, the heater body 804 consists of a PPTC polymer matrix 802 consisting of conductive filler 806 disposed within a polymer 808, with the polymer matrix being sandwiched between two metal foils 810. In an exemplary embodiment, the metal foils 810 each include nodules (bumps) on the one side that interfaces with the PPTC polymer matrix 802, which strengthens the connection between the foils and the matrix.

The heater body 804 may be manufactured so that the PPTC heater containing the heater body has a predefined self-regulation temperature. In an exemplary embodiment, the self-regulation temperature is 125° C., but the PPTC heater and, specifically, the heater body containing the polymer matrix composed of conductive filler and polymer, may be designed to satisfy a wide variety of customer temperature preferences. Specifically, the type of conductive filler and polymer, as well as the percentage combination of each, may be adjusted to achieve a certain self-regulation temperature profile. Accordingly, there are many different materials that may be used to make up both the conductive filler 806 and the polymer 808 of the PPTC polymer matrix 802.

In exemplary embodiments, the polymer 808 includes semi-crystalline polymers, e.g., polyethylene, polyvinylidene fluoride, ethylene tetrafluoroethylene, ethylene-vinyl acetate, ethylene and acrylic acid copolymer, ethylene butyl acrylate copolymer, poly-perfluoroalkoxy, or some combination of one or more of these materials. Further, in exemplary embodiments, the volume percentage of polymer 808 to conductive filler 806 in the PPTC polymer matrix 802 is between 50% and 99%, preferably between 60% and 95%. Thus, for example, at one end of the spectrum, the polymer matrix may consist of 50% polymer and 50% conductive filler. At the other end of the spectrum, the polymer matrix may consist of 99% polymer and 1% conductive filler. Preferably, the polymer matrix may consist of 60% polymer and 40% conductive filler at one end, 95% polymer and 5% conductive filler at the other end, and there are many other combinations in between these preferences that may result in a preferred self-regulation temperature profile.

In exemplary embodiments, the conductive filler 806 of the polymer matrix is made up of carbon, graphene, carbon and graphene, conductive ceramic, carbon nanotubes, carbon with carbon nanotubes, or graphene with carbon nanotubes. In exemplary embodiments, the conductive filler 806 of the PPTC polymer matrix 802 is made up of carbon having a primary particle size of between 10 nm and 100 nm and further with a di-butyl phthalate (DBP) value of between 5 $cm^3$/100 g and 500 $cm^3$/100 g. Preferably, the DBP value ranges from between 8 $cm^3$/100 g and 200 $cm^3$/100 g. Further, in exemplary embodiments, the carbon loading is between 20% and 65%, preferably between 25% and 30%.

In exemplary embodiments, the conductive filler 806 of the PPTC polymer matrix 802 is made up of graphene, where the graphene is prepared by a mechanical or chemical method with the graphene layers numbering from one to several hundred, preferably between one and 30 layers. In an exemplary embodiment, the thickness of each graphene layer is less than 20 nm, preferably between 0.34 nm and 10.2 nm. Further, in exemplary embodiments, the graphene particle size ranges from between 0.1 μm and 100 μm. prefer between 5 μm and 30 μm. The graphene loading is between 1% and 50%, preferably between 4% and 30%.

In exemplary embodiments, the conductive filler 806 of the PPTC polymer matrix 802 is made up of carbon or conductive ceramic, where the carbon primary particle size is between 10 nm and 100 nm, with a DBP value of between 5 $cm^3$/100 g and 500 $cm^3$/100 g, preferably with a DBP value range from between 8 $cm^3$/100 g and 200 $cm^3$/100 g. The ratio of carbon or conductive ceramic to graphene may be between 0%/100% (no carbon/conductive ceramic, 100% graphene) and 100%/0% (100% carbon or conductive ceramic, no graphene), and anywhere in between. In a preferred embodiment, the ratio of carbon or conductive ceramic to graphene would be between 1% and 90%, preferably between 30% and 60%.

In exemplary embodiments, the conductive filler 806 of the PPTC polymer matrix 802 is made up of carbon nanotube (CNT) or graphene with carbon, with the carbon primary particle size being between 10 nm and 100 nm, with a DBP value of between 5 $cm^3/100$ g and 500 $cm^3/100$ g, preferably with a DBP value range from between 8 $cm^3/100$ g and 200 $cm^3/100$ g. In an exemplary embodiment, the nanotube length of the conductive filler 806 is from between 10 nm and 10 µm, the diameter is between 2 nm and 50 nm, with the length/diameter of the CNT being between 5 and 5000, preferably between 100 and 1000. In an exemplary embodiment, the ratio of carbon to graphene or carbon to nanotube is between 1% and 90%, preferably between 30% and 60%.

Further, in exemplary embodiments, either the polymer 808 or the conductive filler 806, or both, of the PPTC polymer matrix 802 are supplemented with materials including, but not limited to, antioxidants, dispersion agents, coupling agents, cross-linkers, arc suppressants, and so on. Thus, the heater body 804 may be manufactured using a wide variety of materials, and the heater body of FIG. 8 may be part of any of the PPTC heaters disclosed and described herein.

FIGS. 9A-9C and 10A-10C provide two test examples of using annular-shaped PPTC heaters, such as the PPTC heater 100 of FIGS. 1A-1C, in accordance with exemplary embodiments. The first test example (FIGS. 9A-9C) tests a PPTC heater having a horizontal gap between two inner electrodes, such as in FIGS. 1A-1C while the second test example (FIGS. 10A-10C) tests a PPTC heater having a vertical gap between two inner electrodes, such as in FIGS. 2A-2C.

Figure 9A:
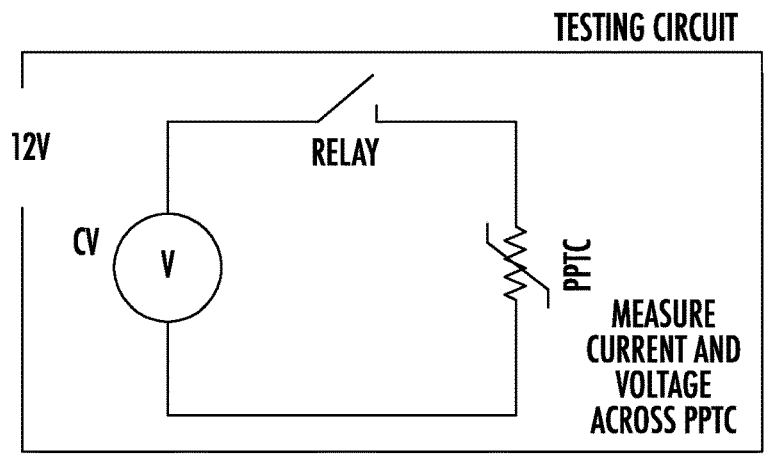
FIGS. 9A-9C are a testing circuit and two graphs related to testing a PPTC heater, in accordance with exemplary embodiments.

FIG. 9A shows a testing circuit, in which 12V is supplied to the circuit, the maximum current is 20 A, and the chamber temperature is at −40° C. Both the current and voltage are measured across the PPTC heater. Further, the PPTC heater is characterized as having an initial resistance of 0.38Ω, the height of the PPTC heater is 9.7 mm (e.g., electrode 106+gap 116+electrode 102 in FIG. 1A), the thickness of the PPTC heater is 0.55 mm (e.g., electrode 102+thickness 120+electrode 118 in FIG. 1B), the diameter of the annular-shaped PPTC heater is 9.5 mm, with a ~0.4 mm gap (see e.g., FIG. 1C, where the space between the wires 108 and 110 is the gap), and the area of the PPTC heater (that is, the area of the circle formed by the annular shape of the PPTC heater) is 2.5 $cm^2$. Further, there are two horizontal electrodes on the inner surface (e.g., electrodes 102 and 106 in FIG. 1C) and one full-size electrode on the outer surface of the PPTC heater (e.g., electrode 118 in FIG. 1C).

Figure 9B:
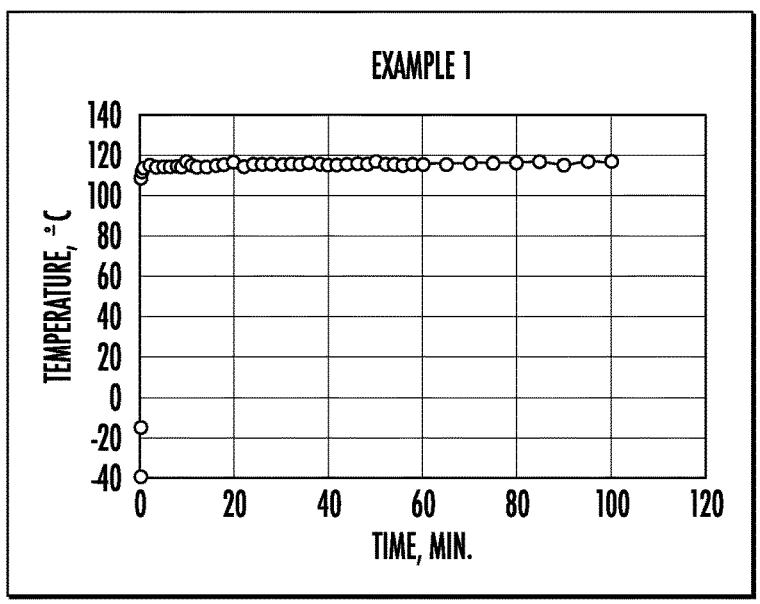
Figure 9C:
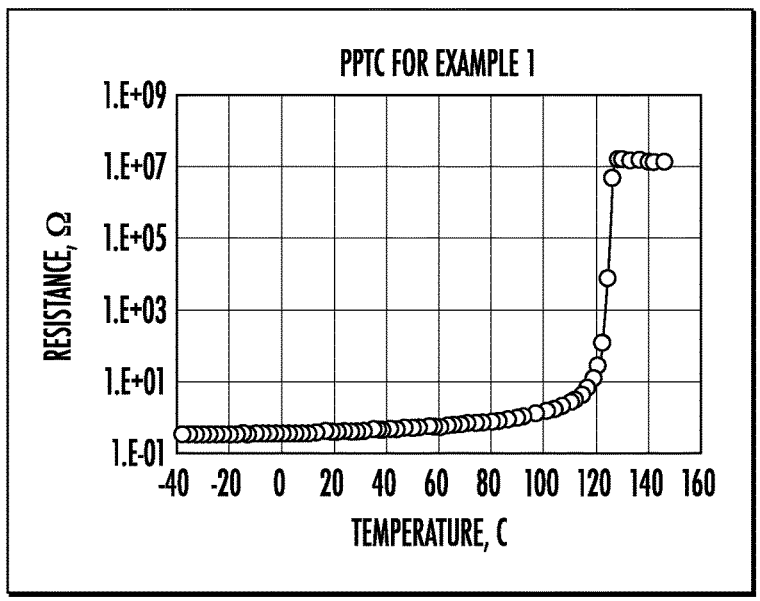

FIG. 9B is a graph plotting temperature (° C.) versus time (min) for the PPTC heater. The temperature starts at −40° C., the chamber temperature, before shooting up very quickly to about 120° C. This 120° C. temperature is maintained for the duration of the test (100 minutes). FIG. 9C is a graph plotting resistance (Ω) versus temperature (° C.) for the PPTC heater. As the temperature increases, the resistance of the PPTC heater remains quite low, then, after the temperature reaches about 100° C., there is some increase in the resistance, with the resistance shooting up very quickly once the temperature reaches about 125° C. Further, the temperature does not increase significantly above the 125° C., which shows that the PPTC heater is self-regulating at about 125° C.

Figure 10A:
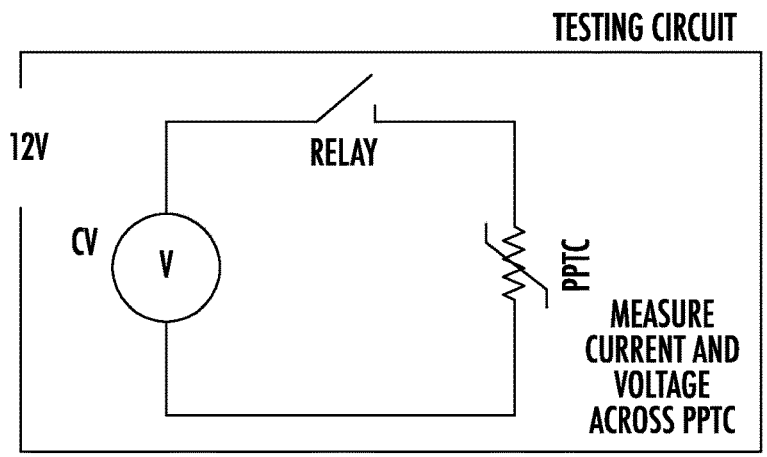
FIGS. 10A-10C are a testing circuit and two graphs related to testing a PPTC heater, in accordance with exemplary embodiments.
Figure 10B:
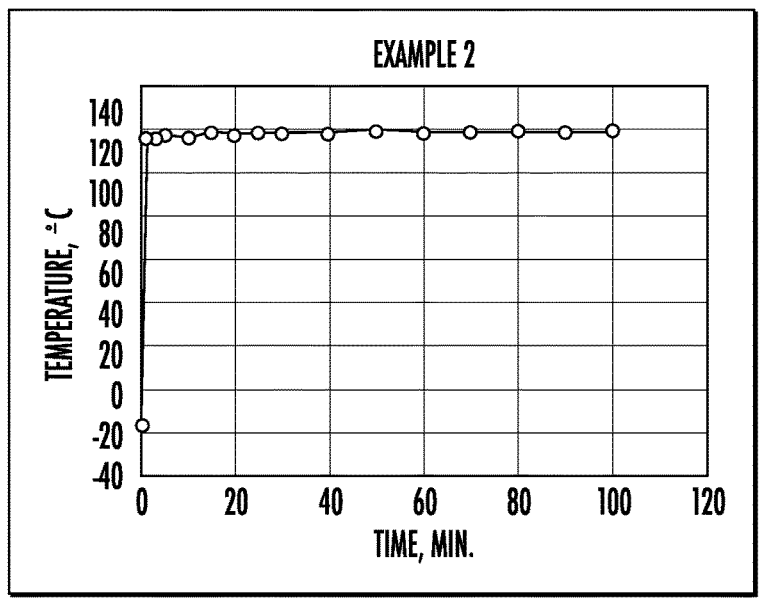
Figure 10C:
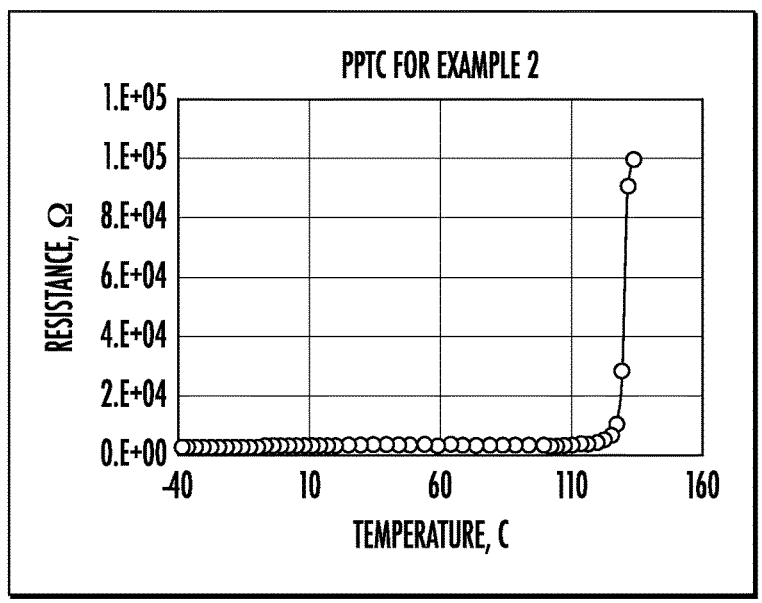

FIGS. 10A-10C feature the second test example for a PPTC heater, according to exemplary embodiments. FIG. 10A shows a testing circuit, in which 12V is supplied to the circuit, the maximum current is 20 A, and the chamber temperature is at −40° C. Both the current and voltage are measured across the PPTC heater. Further, the PPTC heater is characterized as having an initial resistance of 2.27 Ω, the height of the PPTC heater is 8.6 cm (e.g., electrode 206+gap 216+electrode 202 in FIG. 2A), the thickness of the PPTC heater is 0.34 mm (e.g., electrode 202+thickness 220+ electrode 218 in FIG. 2B), the diameter of the annular-shaped PPTC heater is 1.2 cm, with a gap of about 0.4 mm (see e.g., FIG. 2C), and the area of the PPTC heater is 2.5 $cm^2$. Further, there are two vertical electrodes on the inner surface (e.g., electrodes 202 and 206 in FIG. 2C) and one full-size electrode on the outer surface of the PPTC heater (e.g., electrode 218 in FIG. 2C).

FIG. 10B is a graph plotting temperature (° C.) versus time (min) for the PPTC heater. The temperature starts at −40° C., the chamber temperature, before shooting up very quickly to about 120° C. This 120° C. temperature is maintained for the duration of the test (100 minutes). FIG. 10C is a graph plotting resistance (Ω) versus temperature (° C.) for the PPTC heater. As the temperature increases, the resistance of the PPTC heater remains quite low (even lower than in Example 1, FIG. 9C), then, after the temperature reaches about 125° C., the resistance shoots up very quickly. Further, the temperature does not increase significantly above the 125° C., which shows that the PPTC heater is self-regulating at about 125° C.

Figure 11A:
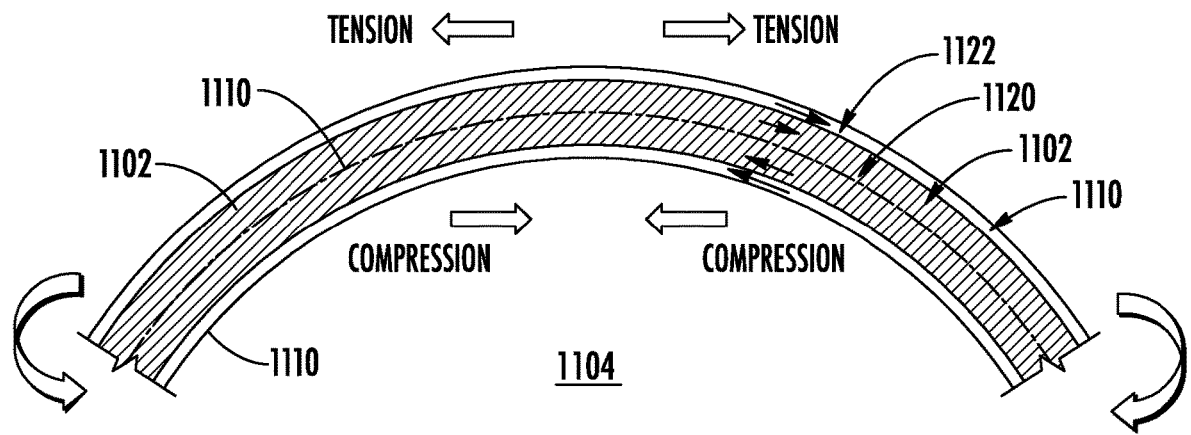
FIGS. 11A and 11B are illustrations of the effects of bending the PPTC heater, in accordance with exemplary embodiments.
Figure 11B:
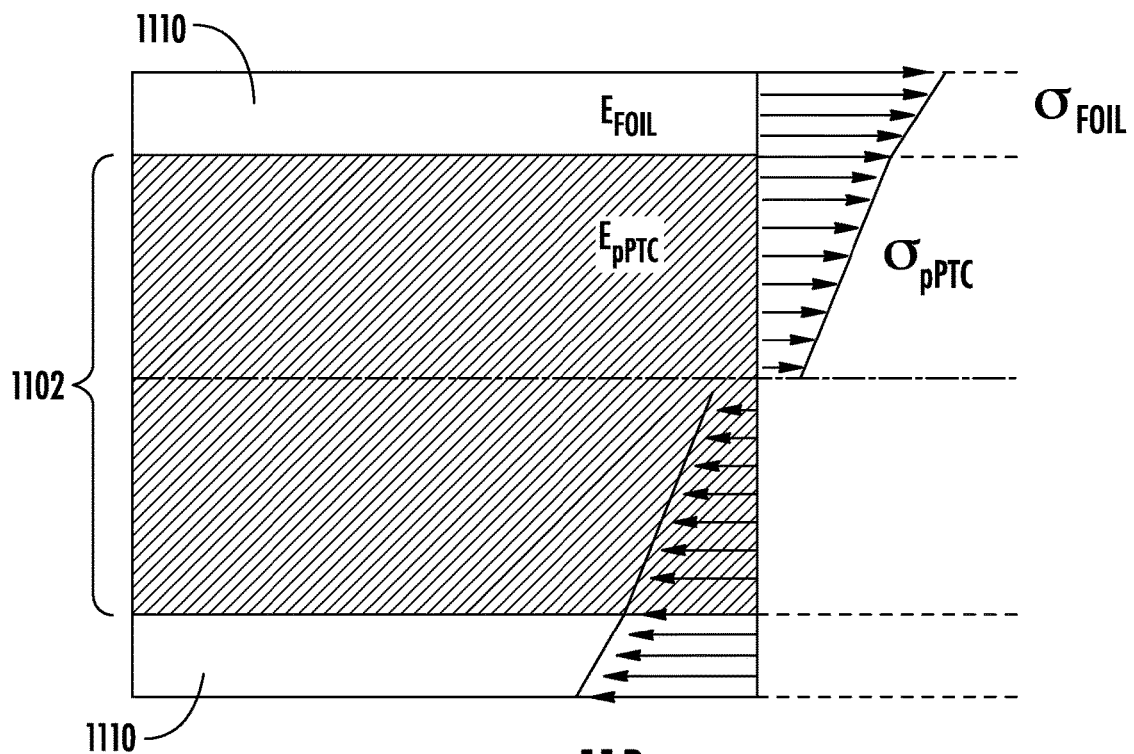

FIGS. 11A and 11B are representative diagrams illustrating effects of the bending process for the PPTC material of a PPTC heater, such as any of the PPTC heaters disclosed herein, specifically the heater body that contains the PPTC polymer matrix, according to exemplary embodiments. Recall from FIG. 8 that the heater body 804 of any of the PPTC heaters illustrated and described herein consists of a PPTC polymer matrix 802. The PPTC polymer matrix 802 consists of both conductive material (filler) 806 and polymer 808, with the PPTC polymer matrix being sandwiched between two sheets of metal foil 810. Similarly, in FIG. 11A, a heater body 1104 of a PPTC heater (PPTC heater body 1104) consists of a PPTC polymer matrix 1102 with metal foil 1110 disposed on either side of the polymer matrix. Because the PPTC heaters disclosed herein are bent into an annular shape, such as for use with an actuator or other cylindrical device, they undergo a novel bending process not characteristic of legacy PPTC devices.

In an exemplary embodiment, based on its material composition, the PPTC polymer matrix 1102 is able to bend in an elastic-plastic range, that is, as if both elastic and plastic deformation occur, although the plastic deformation is very small. An imaginary neutral line 1120 shows that the PPTC polymer matrix 1102 is quite bendable. Recall that the metal foils 1110 may include nodules disposed on the side that is adjacent to the PPTC polymer matrix 1102, to improve a connection between the two interfaces. In some embodiments, the modulus of the metal foils 1110 are high enough to move in an elastic range during bending. Nevertheless, the bending causes a tension of the outside metal foil 1110 and half of the PPTC polymer matrix 1102 while, at the same time, a compression of the inside metal foil and another half of the PPTC polymer matrix 1102. Further, there is the imaginary neutral line 1120 between the half of the PPTC polymer matrix 1102 and another half of PTC polymer matrix 1102.

Heating of the PPTC heater during the bending operation is not necessary. In one embodiment, some heat is applied to the PPTC heater during the bending operation. However, the heating temperature is maintained below the semi-crystalline polymer melt temperature. Otherwise, the properties of the conductive particles in the PPTC polymer matrix will change, possibly disrupting the manufacturing process of the PPTC heater. Once the heater body 1104 assumes the desired annular shape following bending, an annealing process may be employed to release the bending stress.

FIG. 11B is a diagram illustrating the stress and strain characteristics of the PPTC heater body 1104 of FIG. 11A, according to exemplary embodiments. The stress, given by σ, is shown for both the outside metal foil 1110 ($\sigma_{foil}$) and the PPTC polymer matrix 1102 ($\sigma_{pPTC}$). The modulus of elasticity, given by E, is also given for the outside metal foil 1110 ($E_{foil}$) and the PPTC polymer matrix 1102 ($E_{pPTC}$). From this information, the strain, ε, on each material may be calculated, using the formula, σ=E ε.

Figure 12:
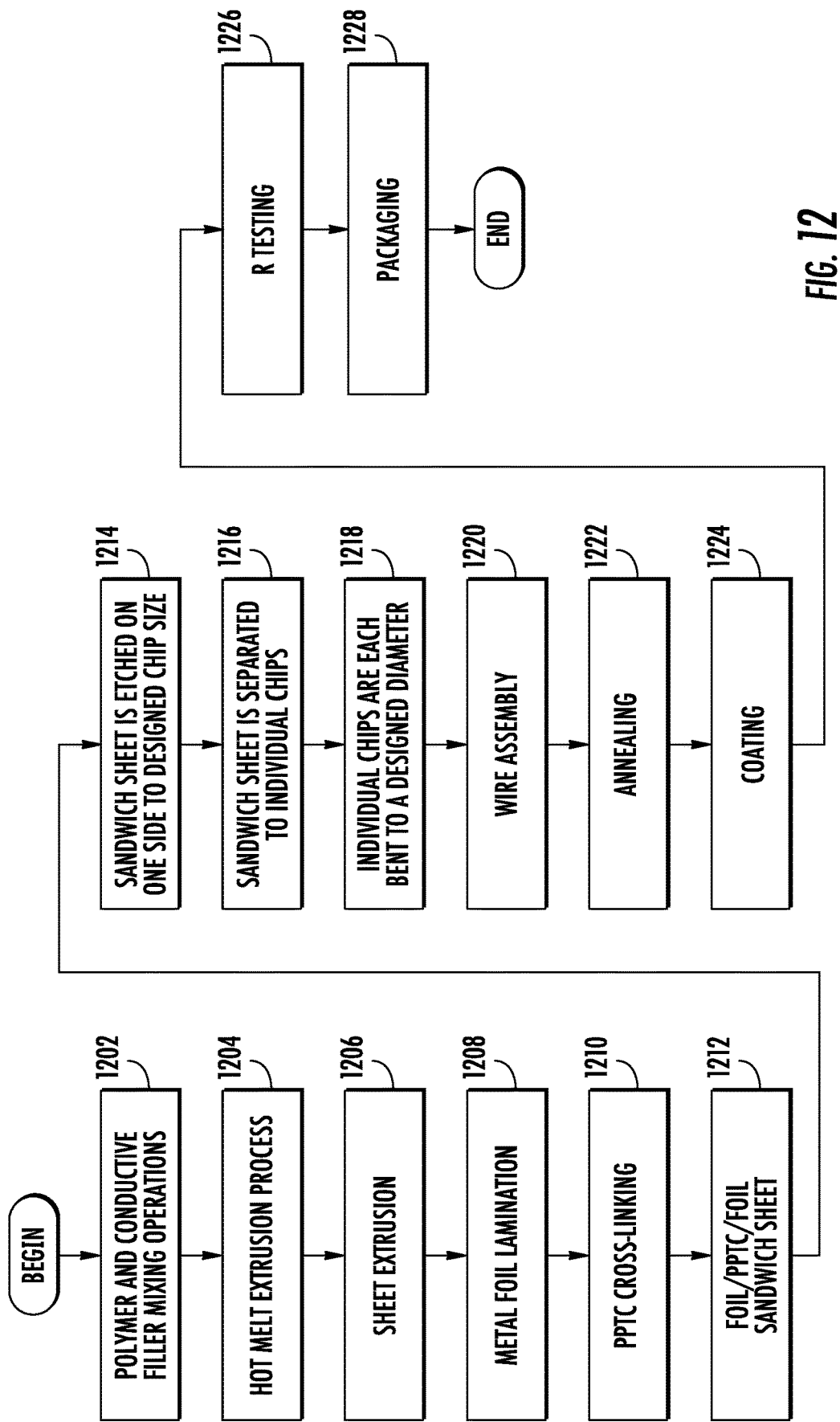
FIG. 12 is a flow diagram of the manufacture of a PPTC heater, in accordance with exemplary embodiments.

FIG. 12 is a flow diagram showing process steps for manufacturing a PPTC heater such as any one of the PPTC heaters 100, 200, 400, 500, and 600, according to exemplary embodiments. The manufacturing process commences with polymer and conductive filler mixing operations (block 1202), as these make up the polymer matrix described above. A hot melt extrusion process is then undertaken on the polymer matrix (block 1204). Hot melt extrusion (HME) is the process of applying heat and pressure to melt a polymer and force it through an orifice in a continuous process. This enables the polymer matrix to assume a predefined uniform shape and density. The polymer matrix is then extruded into sheets (block 1206). The extruded sheet of polymer matrix is then laminated on both sides with metal foil (block 1208), forming the sandwich of metal foil (electrodes) with the polymer matrix in between, as described in the aforementioned PPTC heaters.

Following the metal foil lamination, a PPTC cross-linking operation is performed on the polymer matrix (block 1210). In polymer chemistry, cross-linking employs cross-links to promote a change in the polymer's physical properties. Here, the polymer matrix is cross-linked so that a PPTC with desired properties emerges. In exemplary embodiments, the PPTC crosslinking is achieved by electron beaming, gamma irradiation, or chemical crosslinking. A foil-PPTC-foil sandwich sheet is then formed (block 1212). The sandwich sheet is then etched on one side (where N=1) or etched on both sides (if N=3) to a designed chip size (block 1214). The sandwich sheet is then cut based on the etch into individual chips (block 1216), where each chip is a sandwich of metal foil-PPTC-metal foil, as desired for the PPTC heater.

Next, the individual chips are each bent to form annular shapes at a designated diameter (block 1218). Although the embodiments described herein have been ring-shaped so as to fit over a cylindrical actuator, the individual chips may alternatively be bent into other shapes suitable for the desired application. For example, the chips may be bent to form a rectangular shape for coupling with an actuator or other device that is shaped like a cube or a rectangular cube. Or the chips may be bent into another geometric shape suitable for coupling with an actuator that is triangle shaped, pyramid shaped, prism shaped, trapezoid shaped, hexagonal, octagonal, pentagonal, or any of a variety of other geometric shapes. Or the chips may be bent into an oblong shape suitable for coupling to an actuator or other device that has a non-geometric shape. In exemplary embodiments, the shape of the PPTC heater is bent at this stage to conform to the shape of the device to be heated.

Following the bending of the chips to the desired shape, a wire assembly is performed in which the wires (e.g., wires 108 and 110 of FIG. 1A) are attached to the sandwiched chip (block 1220). An annealing process is then performed in which the sandwiched chip is heated and allowed to cool slowly in order to remove internal stresses and toughen the material. The sandwiched chip is then coated with a suitable material to protect the device or add other functions to the device (block 1222). For example, in one embodiment, a temperature-sensitive coating is added that causes the device to change colors at different temperatures. R testing of the device is then performed (block 1226) and the device is packaged in a suitable packaging material (block 1228). The PPTC heater manufacturing process steps are thus complete.

One or more of the PPTC processing steps in FIG. 12 may be performed in an order other than is shown. For example, the operations of block 1224 may be performed before the operations of block 1218. Process engineers of ordinary skill in the art will recognize a number of ways in which these manufacturing operations may be performed.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A polymeric positive temperature coefficient (PPTC) heater comprising:
   a heater body formed of a PPTC polymer matrix comprising a conductive filler and a semi-crystalline: polymer;
   a first electrode disposed on a first side of the heater body and coupled to a first wire;
   a second electrode disposed on the first side of the heater body and spaced apart from the first electrode to define a gap therebetween; and
   a third electrode disposed on a second side of the heater body opposite the first side and coupled to a second wire, wherein the heater body has a first thickness measured between the first electrode and the third electrode, wherein the gap has a second thickness greater than the first thickness;
   wherein the heater body, the first electrode, and the second electrode are arranged in an annular shape.

2. The PPTC heater of claim 1, wherein the second thickness is between 3 mils and 120 mils.

3. The PPTC heater of claim 1, wherein the first thickness is 10 mils and the second thickness is 50 mils.

4. The PPTC heater of claim 1, wherein the conductive filler is selected from a group consisting of carbon, graphene, carbon and graphene, conductive ceramic, carbon nanotubes, carbon with carbon nanotubes, and graphene with carbon nanotubes.

5. The PPTC heater of claim 1, wherein the semi-crystalline polymer is selected from a group consisting of polyethylene, polyvinylidene fluoride, ethylene tetrafluoroethylene, ethylene-vinyl acetate, ethylene and acrylic acid copolymer, ethylene butyl acrylate copolymer, and polyperfluoroalkoxy.

6. The PPTC heater of claim 1, wherein the heater body has a self-regulation temperature of 125° C.

7. A polymeric positive temperature coefficient (PPTC) heater, comprising:
- a heater body comprising a conductive tiller and a semicrystalline polymer, the heater body being configured into a rectangular sheet having a first thickness;
- a first electrode disposed on a first side of the heater body, wherein the first electrode is coupled to a first wire; and
- a second electrode disposed on a second side of the heater body opposite the first side; and
- a third electrode disposed on the first side of the heater body and spaced apart from the first electrode to define a gap therebetween, the gap exposing the heater body, wherein the third electrode is coupled to a second wire, and wherein the gap is elongated in a direction parallel to the first and second wires;
- wherein the heater body, the first electrode and the second electrode are formed into an annular shape.

8. The PPTC heater of claim 7, wherein the first electrode and the third electrode are disposed on an inner surface of the annular shape.

9. The PPTC heater of claim 7, the gap having a second thickness, wherein the second thickness is greater than the first thickness.

10. The PPTC heater of claim 7, wherein the heater body has a self-regulation temperature of 125° C.

11. The PPTC heater of claim 9, wherein the first thickness is 10 mils and the second thickness is 50 mils.

* * * * *